F. J. NICE.
VEHICLE SPRING.
APPLICATION FILED FEB. 25, 1911.
1,007,479.
Patented Oct. 31, 1911.
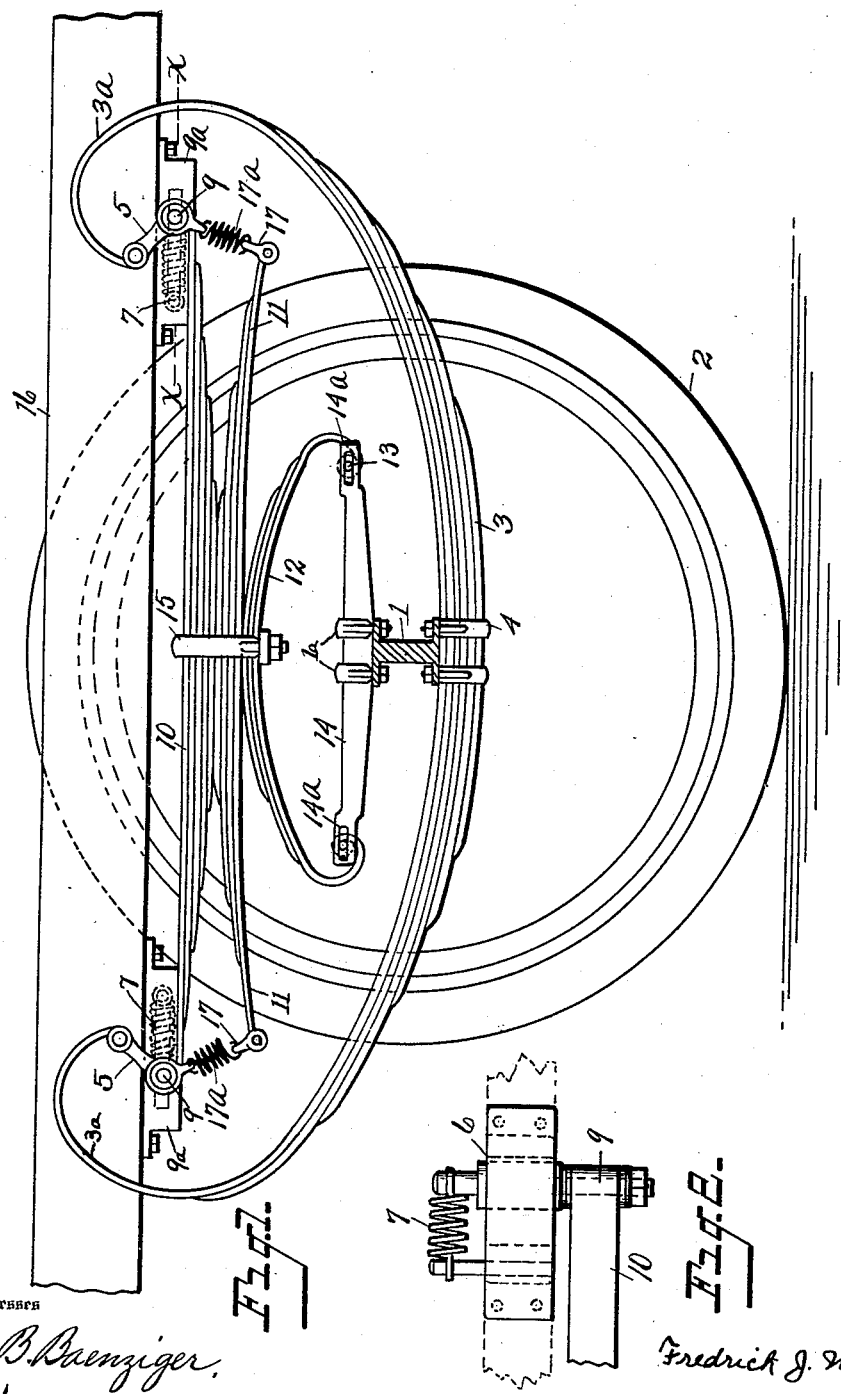

UNITED STATES PATENT OFFICE.

FREDRICK J. NICE, OF PONTIAC, MICHIGAN.

VEHICLE-SPRING.

1,007,479.   Specification of Letters Patent.   Patented Oct. 31, 1911.

Application filed February 25, 1911. Serial No. 610,686.

*To all whom it may concern:*

Be it known that I, FREDRICK J. NICE, a citizen of the United States, residing at Pontiac, county of Oakland, State of Michigan, have invented a certain new and useful Improvement in Vehicle-Springs, and declare the following to be a full, clear, and exact description of the same, such as will enable others skilled in the art to which it pertains to make and use the same, reference being had to the accompanying drawings, which form a part of this specification.

This invention relates to vehicle springs, and has for its object an improved device, whereby, regardless of whether or not the wheels of the vehicle are provided with pneumatic tires, a large proportion of the shocks due to inequalities in the road surface are eliminated, or rather absorbed, before reaching the body of the vehicle.

In the drawings:—Figure 1 is a side elevation of a fragmentary portion of a vehicle body, showing its position and that of the outlined traction wheel with respect to the springs. Fig. 2, is a detailed plan view along the line x—x of Fig. 1.

1 represents an axle of the vehicle, upon which the wheel 2 is journaled; mounted thereon with its central portion fixed to the axle by adjacent yoke or slings 4 is an upwardly arched spring 3, whose ends 3ª bend over upon themselves somewhat, and are pivotally connected with shackles or links 5. The lower end of each of these links engages about a horizontal and transversely extending pin 9, which slidably engages in a dependent track-way 9ª, which is fixed to the under side of the vehicle body, the pin 9 being yieldingly held near that end of the track-way adjacent to the rising portion of the spring 3, whose tip end overhangs the track-way, by means of the spring 7. The link 5, being normally in an oblique position is adapted, as the load carried by the vehicle body is increased, to assume a more nearly vertical position, even against the pressure of the spring 7, so that it will more nearly assume the position of a supporting or pendent link constituting structurally a continuation of the overhanging end 3ª of the spring 3.

With its ends preferably extending under the track way pieces 9ª, and consequently spaced by the vertical height of these track way pieces, from the under surface of the vehicle body, is a flat cushioned spring 10.

If, however, the pieces 9ª are of only such breadth as is shown in Fig. 2, the springs 10 really lie to one side thereof, being connected at their ends to the pin 9 which extends therebeneath in each case. Immediately beneath its central portion is located the center of a very slightly curved or else a similarly flat spring 11, the several springs 3, 10, 11, and 12 lying in substantially the same vertical plane. The ends are connected with the link 5 by means of the link members 17 whose central portion is constituted by the spiral springs 17ª; the upper portion of each link 17 engages about the pin 9, and thus loosely connects the spring end 3ª with the end of the spring 11, since the spring end 3ª is connected with the pin 9 by the link 5. The tendency of this last-named spring 11 is to counteract, through the medium of these elastic links, the tendency of the outer ends of the spring 10 which either engages under the track way members 9ª, or connects with the pin 9 which extends therebeneath, to rise unduly with respect to the central portion, when the load that has been imposed upon the vehicle body is removed, as well as to relieve the large spring when it is placed under compressive strain. Beneath these two springs, and held to them by a yoke 15, is a downwardly arched spring 12, which is "scrolled" at its ends similarly to the ends 3ª of the spring 3. The tips of this spring carry pins 13, which engage in the slots 14ª of the horizontal and lengthwise extending bar 14, which is rigidly mounted across the axle 1, being attached thereto by means of slings 4. As the vehicle body has its load increased, the tendency of the spring 12 would naturally be to flatten, resulting in spacing its ends which carry the pins 13 farther apart, and drawing them to the outer limits of the slots 14ª in the bar 14, their normal position being close to the inner ends of these slots. This however, occurs only to a relatively slight degree before the influence of the other springs comes into play, resulting in avoidance of an undue strain upon any one of the springs, and a coöperating transmission of a certain proportion of any strain that occurs on any one of the springs to the other springs, something that is not true in either a full elliptic or a half elliptic spring.

What I claim is:—

1. In a vehicle spring, in combination with a wheel axle and a vehicle body, a pair of flat spring members located in supporting position with respect to said vehicle body, spring members yieldingly linking the ends of said flat spring members to one another, a pair of arched spring members attached to said axle and yoked to the central portion of said flat spring members respectively, and slotted anchorage means for the ends of said arched springs, whereby their position with respect to the other members is controlled under the varying conditions of strain and load imposed thereupon, substantially as described.

2. A vehicle spring, having, in combination with a wheel axle and a rigid horizontal bar supported thereby, a pair of arched springs, one fixed at its center to said axle and the other having a slot connection at its ends with the ends of said rigid horizontal bar, a pair of flat springs resting upon the upturned central portion of the second of said arched springs, and link connections between the ends of said springs and the bent over ends of the first of said arched springs, whereby a portion of the strain imposed upon either is communicated to the other, substantially as described.

3. In a vehicle spring, the combination of a pair of flat spring members, a pair of arched spring members, a wheel axle to which one of said arched spring members is fixed, and with the other of which the axle has a slot connection, and link members connecting the ends of said flat spring members with the bent over ends of that one of the arched spring members which is attached to the axle, substantially as described.

In testimony whereof, I sign this specification in the presence of two witnesses.

FREDRICK J. NICE.

Witnesses:
VIRGINIA C. SPRATT,
WILLIAM M. SWAN.

---

Copies of this patent may be obtained for five cents each, by addressing the "Commissioner of Patents, Washington, D. C."